3,792,117
FLAME RESISTANT POLYESTER
William Kolodchin, Warren, and David R. Brackenridge, Royal Oak, Mich., assignors to Ethyl Corporation, Richmond, Va.
No Drawing. Filed Sept. 15, 1971, Ser. No. 180,871
Int. Cl. C08f 1/00
U.S. Cl. 260—864      4 Claims

ABSTRACT OF THE DISCLOSURE

The flame resistance of polyesters can be enhanced with a phosphazene, i.e., a condensation product of a phosphonitrilic dihalide and 2,3-dibromopropanol. Saturated and unsaturated resins can be used as can thermoplastic and thermosetting materials, linear and cross-linked polymers, and fibers and films.

BACKGROUND OF THE INVENTION

Condensation products of 2,3-dibromopropanol and phosphonitrilic dihalides are known as phosphazenes and have been suggested for use as flame retardants for cotton fabric; Hamalainen, U.S. Pat. 2,681,295, and Hamalainen et al., Textile Research Journal, 26, 141 (1956). They can be prepared by reacting phosphonitrilic dihalide with the alcohol in the presence of pyridine, Hamalainen, supra, cf. also Lipkin, U.S. Pat. 2,192,921. Other routes can be employed; for example, the corresponding allyl derivative can be brominated; Hamalinen et al., supra.

Phosphonitrilic halides can be prepared by reacting ammonium chloride with phosphorus pentachloride; Emsley et al., J. Chem. Soc. (A) 768 (1971) and references cited therein.

Various fire retardants have been suggested for polyesters, confer, for example, U.S. Pats. 2,909,501, 3,285,-995, 3,309,425 and 3,434,981.

SUMMARY OF THE INVENTION

As a composition of matter, a polyester having a flame retarding amount of a phosphazene, viz, a condensation product of 2,3-dibromopropanol and phosphonitrilic dihalide. Thermoplastic and thermosetting polyesters are encompassed by this invention. The polyesters may be cross-linked or linear. Also, they may be films, fibers, fabrics, or garments made from such fibers.

A method of enhancing the flame resistance of a polyester, said method comprising incorporating therein or admixing therewith a flame resistance-enhancing amount of a phosphazene which is a condensation product of phosphonitrillic dihalide and 2,3-dibromopropanol.

DESCRIPTION OF PREFERRED EMBODIMENTS

The phosphazenes utilized in this invention are usually liquid and are phosphonitrilate polymer having the formula

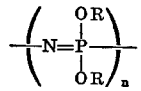

where R is 2,3-dibromopropoxy and n is an integer of at least 3. When cyclic, the value of n is usually 3, 4, 5, or 6. When the polymer is linear, the value of n can be these or greater. Preferred products of this invention give a homogeneous, one-phase system when mixed with equal volumes of cyclohexane.

Polyesters include linear and cross-linked polymers. The linear materials are prepared by reacting di-acids with glycols and are thermoplastic in nature. Typically, the glycol is ethylene glycol and the acid is isophthalic or terephthalic acid. Fibers can be spun from such materials.

A larger group of polyesters is the unsaturated resins. These are used for reinforced shapes and coatings. For these resins, unsaturated acids or alcohols are incorporated in the polymer. By "unsaturated" is meant the presence of an active carbon-to-carbon double bond. Through this unsaturation, cross-linking is achieved. For example, if some of the phthalic acid in the polymer above is replaced by maleic acid, then cross-linking can be achieved using divinylbenzene or styrene. To achieve this cross-linking, a curing agent is mixed with the polymerizable mixture; typically, the curing agent is an organic peroxide.

Unsaturated polyesters of this type are called alkyd resins in the paint industry. They have many advantageous properties such as strength, weather resistance, pigmentability, etc.

As is well known, unsaturated polyester resins are based on prepolymers which are made by the esterification of dihydric alcohols with unsaturated and modifying dibasic acids and/or anhydrides. The unsaturated polymer is mixed with an unsaturated monomer (e.g. styrene) with which it cross links. A catalyst, polymerization inhibitor and inert filler are among the typical additives; Chemical Economics Handbook, 580.1230E Plastics and Resins, Stanford Research Institute (1969).

Polyester fibers are made by direct esterification, for example, reaction of tetrephthalic acid with ethylene glycol, or by transesterification. In the latter route, there is a catalyzed exchange of ethylene glycol for methyl groups of dimethylterephthalate. The liberated methanol is removed by distillation to drive the exchange to completion. The 2-hydroxyethylterephthalate so formed undergoes polycondensation, usually in the presence of a catalyst, to form the polymer. This may be broken into chips, blended, and remelted before spinning. Alternately, the polymer can be made and continuously fed to spinnarets. Chemical Economics Handbook, Fibers-Synthetic; 543.4820G, December 1969, Stanford Research Institute, Menlo Park, Calif.

Polyester resins of the above types are well known in the prior art; cf. for example, U.S. Pats. 2,909,501 3,285,995, 3,309,425, 3,434,981; and Unsaturated Polyesters, Boenig, Elsevier Publishing Company, New York, N.Y., (1964). Descriptions of such resins in these works are incorporated by reference herein as if fully set forth. Some unsaturated resins which are articles of commerce are, for example, the Glaskyd and Laminac Resins made available by American Cyanamid Company.

In accordance with this invention, flame resistance-enhancing amount of condensation product of phosphonitrilic dihalide and 2,3-dibromopropanol is admixed with a polyester of the classes described above. The mixing can be accomplished by any technique suitable to a skilled practitioner. Thus, for example, the flame retardant agent can be thoroughly mixed with molten polymer before feeding to the spinnaret. Furthermore, the agent can be milled or molded with the resin, or blended with a prepolymer-unsaturated monomer mixture. In general, from about 2 to about 40 weight percent or more additive is used. More preferably, from about 5 to about 30 weight percent additive is employed and most preferably from about 10 to about 20 weight percent.

Any test designed to indicate flame retardance can be used to demonstrate the flame retardance of the polyester compositions of this invention. Tests are set forth in U.S. Pats. 2,909,501, 3,285,995, 3,434,981, 3,309,425, supra.

EXAMPLE

A polyester resin, Polyite 31–007 from Reichold Chemical Corporation, 57 parts, was blended with 43 percent styrene and the amount of additive shown below. The mixture was cured at 50° C. overnight using one percent benzoyl peroxide. Thereafter, it was postcured at 80° C. for three hours. Flame retardance was demonstrated by the Limiting Oxygen Index Standard Test LOI.

| | Conc. wt. percent | LOI | Remarks |
|---|---|---|---|
| Hexa(2,3-bromopropyl)-phosphazene.* | 15 | 24.5 | Chars, copious smoke. |
| 2,3-dibromopropylphosphate | 15 | 22.5 | Very slow melt. |
| Hexapropoxyphosphazene | 15 | | Not compatible. |
| Blank | | 18.4 | Very slow melt. |

*Hexa(2,3-dibromopropoxy) derivative of a preparation of phosphonitrilic dichloride which is a 98 percent mixture of trimer and tetramer available from Research Organic/Inorganic Chemical Corporation 11686 Sheldon Street, Sun Valley, California 91352.

Similar results are obtained when the 2,3-dibromopropoxy derivative is made from $PNCl_2$ preparations having any of the compositions in Tables 1–5 of Emsely, supra, (or analogous $PNBr_2$ compositions) in amounts from 2 to 40 weight percent.

Similar compositions are made using fibers of poly-(ethyleneisophthalate) prepared by transesterification of ethylene glycol and isophthalic acid methyl ester or other suitable technique. The fibers have 3 to 30 weight percent of a fire retardant additive as described above.

The results of the above example suggest that condensation products of phosphonitrilic dihalide (chloride or bromide) and 2,3-dibromopropanol can be used to flame retard other materials such as polystyrene, polyvinyl chloride, polyurethane, polycarbonate, polyamide, and epoxy resins.

For polystyrene, molding powders or expandable beads can be prepared. In addition, the surface of an expandable bead can be impregnated with mixtures of the fire retardant additive and organic media such as propanol, methanol, toluene, etc. and then dried.

As to polymers suggested, reference is made to Floyd, Polyamide Resins (1958); Skeist, Epoxy Resins (1958); Dombrow Polyurethanes (1958); and Christopher and Fox, Polycarbonates, all published by Reinhold Publishing Corp. New York, N.Y. Polymer compositions disclosed therein are incorporated by reference herein as if fully set forth. To illustrate this portion of the invention the following compositions which may be treated with from 2 to 40 weight percent of a 2,3-dibromopropoxyphosphazene prepared from any of the $PNCl_2$ compositions set forth in Tables 1–5 of Emsley, supra.

| Polystyrene molding powder: | Parts by weight |
|---|---|
| Styrene | 10,000 |
| Barium sulfate | 100 |
| Benzoyl peroxide | 25 |
| Water | 20,000 |
| Polystyrene expandable bead: | |
| Styrene | 20,000 |
| Sodium pyrophosphate | 2 |

| Polystyrene expandable bead: | Parts by weight |
|---|---|
| Hexane | 1,500 |
| Benzoyl peroxide | 70 |
| Water | 20,000 |
| Protective colloid | 70 |
| PVC composition: | |
| Polyvinyl chloride | 100 |
| Dioctyl phthalate | 40–50 |
| Tin stabilizer | 9 |

In addition, epoxy resins, polyamides, and polycarbonates disclosed in the above-cited books can be treated with 2 to 40 weight percent of a phosphazene additive of this invention.

The above results suggest that phosphazenes analogous to those above, but which are derived from other brominated alcohols, can also be used. Thus, it is suggested that condensation products of phosphonitrilic dihalide and alcohols having the formula

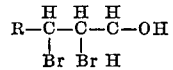

wherein R is an alkyl or a halogenated radical of one to six or more carbons which can also be used. Thus, for example, R can be $CH_3$—, $CH_2Br$—, $CHBr_2$—, $CBr_3$—, $C_2H_5$—, n-$C_6H_{13}$— and $CH_3$—CHBr—CHBr—$CH_2$—, and the like. Such compounds may be compounded with the above substrates in the amounts above mentioned.

What is claimed is:

1. A linear polyester of a glycol and a phthalic acid having incorporated therein a flame retardant amount of a condensation product of phosphonitrilic dihalide and 2,3-dibromopropanol.

2. A composition of claim 1 containing hexa(2,3-dibromopropyl)phosphazene.

3. An unsaturated polyester resin having incorporated therein a flame retardant amount of condensation product of phosphonitrilic dihalide and 2,3-dibromopropanol; said resin being prepolymer, made by esterification of glycol with unsaturated and modifying dibasic acids or anhydrides, cross-linked with an unsaturated monomer.

4. A composition of claim 3 containing hexa(2,3-dibromopropyl)phosphazene.

References Cited

UNITED STATES PATENTS 3,193,397  7/1965  Stephens et al. ———————— 106—15

WILLIAM H. SHORT, Primary Examiner

E. A. NIELSEN, Assistant Examiner

U.S. Cl. X.R.

260—45.8 R